United States Patent
Han

(10) Patent No.: US 12,173,822 B2
(45) Date of Patent: Dec. 24, 2024

(54) FIXING DEVICE FOR PREVENTING PIPE FROM FALLING DOWN

(71) Applicant: YOUNG JIN FLEX CO., LTD., Paju-si (KR)

(72) Inventor: Sang Woo Han, Bucheon-si (KR)

(73) Assignee: YOUNG JIN FLEX CO., LTD., Paju-si (KR)

(*) Notice: Subject to any disclaimer, the term of this patent is extended or adjusted under 35 U.S.C. 154(b) by 0 days.

(21) Appl. No.: 18/359,061

(22) Filed: Jul. 26, 2023

(65) Prior Publication Data

US 2024/0052951 A1 Feb. 15, 2024

(51) Int. Cl.
*F16L 3/205* (2006.01)

(52) U.S. Cl.
CPC ..................... *F16L 3/205* (2013.01)

(58) Field of Classification Search
CPC ... F16L 3/205; F16L 3/21; F16L 3/233; F16L 3/20; F16L 3/127; F16L 3/23; F16L 3/237
See application file for complete search history.

(56) References Cited

U.S. PATENT DOCUMENTS

| | | | | |
|---|---|---|---|---|
| 3,493,206 A * | 2/1970 | Albro | ...................... | F16L 3/133 248/62 |
| 4,306,696 A * | 12/1981 | Pondman | ................... | F16L 3/16 248/62 |
| 4,485,998 A * | 12/1984 | Kowalski | .............. | F16L 3/2053 248/561 |
| 4,524,935 A * | 6/1985 | Rumble | ................... | F16L 3/133 248/62 |
| 4,681,294 A * | 7/1987 | Soltysiak | .............. | F16L 3/2053 248/59 |
| 5,009,386 A * | 4/1991 | Berger | ................... | F16L 3/2053 248/62 |
| 5,588,511 A * | 12/1996 | Kallenbach | ............... | F16L 3/20 188/134 |
| 5,803,506 A * | 9/1998 | Argersinger | ............ | F16L 51/04 285/226 |
| 7,284,728 B2 * | 10/2007 | Connolly | ................ | F16L 3/133 248/62 |

(Continued)

FOREIGN PATENT DOCUMENTS

| | | | |
|---|---|---|---|
| KR | 100677887 B1 | 2/2007 |
| KR | 100898910 B1 | 5/2009 |

(Continued)

*Primary Examiner* — Monica E Millner
(74) *Attorney, Agent, or Firm* — NKL LAW; Jae Youn Kim

(57) ABSTRACT

A fixing device includes: a top body formed in a shape of a pipe having a hollow portion continuously formed from a top to a bottom of the top body, and fastened to a fixing anchor fixedly installed on the structure; an elastic member wrapped on an outer surface of the top body in a ring shape by an elastic force; a wire having a predetermined length, and having an upper portion fastened to the top body and a lower portion fastened to the bottom body so as to prevent the pipe from falling down when the bottom body is separated from the top body due to the falling down of the pipe, wherein the elastic member is formed in a shape of a coil spring and is installed on the top body after being deformed into a ring shape such that both ends thereof are connected to each other.

4 Claims, 8 Drawing Sheets

(56) References Cited

U.S. PATENT DOCUMENTS

| | | | |
|---|---|---|---|
| 7,546,986 B2* | 6/2009 | Kim | F16L 3/1008 248/62 |
| 9,856,997 B2* | 1/2018 | Richter | F16L 51/04 |
| 11,098,825 B2* | 8/2021 | Juzak | F16L 3/11 |
| 11,326,721 B2* | 5/2022 | Rogin | F16L 27/0861 |
| 11,828,412 B2* | 11/2023 | Gumaer | F16M 13/027 |
| 2009/0224533 A1* | 9/2009 | Richter | F16L 51/04 285/61 |
| 2016/0252197 A1* | 9/2016 | Roth | F16L 3/133 248/548 |
| 2017/0138510 A1* | 5/2017 | Kim | F16L 3/133 |
| 2017/0335993 A1* | 11/2017 | Tawata | F16L 3/1091 |

FOREIGN PATENT DOCUMENTS

| | | |
|---|---|---|
| KR | 2020100008935 U | 9/2010 |
| KR | 2020160000677 U | 2/2016 |
| KR | 101810816 B1 | 12/2017 |
| KR | 102007969 B1 | 8/2019 |
| KR | 102106258 B1 | 5/2020 |

* cited by examiner

FIG. 7(a)  FIG. 7(b)

FIXING DEVICE FOR PREVENTING PIPE FROM FALLING DOWN

BACKGROUND OF THE INVENTION

1. Field of the Invention

The present technology relates to a fixing device for preventing a pipe from falling down, which supports the pipe to prevent the same from falling down when the pipe falls down as vibration is transferred to a structure due to an earthquake etc.

2. Description of the Related Art

In general, facilities, such as water supply piping facilities, purification piping facilities, and gas piping facilities, are fully installed in a building, and in such facilities, a rigid pipe made of a metal material or a pipe made of a soft flexible material may be used.

Such a pipe is fixedly installed on a roof or a wall of the building by a material such as a clamp or the like such that the pipe may be fixedly installed on the building without a load of the pipe itself as well as a fluid or gas moving inside the pipe.

Meanwhile, the building in which a plurality of these facilities are installed may be prevented from collapsing by using a seismic design when vibration occurs due to an earthquake etc., but the pipe facilities installed inside the building have limitations in seismic design, thereby causing frequent falling accident due to the vibration.

That is, the pipe is more stable because it is fixed to walls of the building with a clamp in a state where vibration does not occur. However, when vibration enough to shake the pipe itself occurs, the vibration is transferred to the pipe as it is, resulting in shaking, so that the shaking causes a stress applied to the fixed clamp, thereby allowing the clamp to be removed from the structure.

Then, the pipe loses a supporting force by the clamp and falls down to a floor, and such an accident causes a secondary accident.

RELATED ART DOCUMENT

Patent Document (Patent Document 1) Korean Unexamined Utility Model Publication No. 20-2016-677 (Publication date: Feb. 29, 2016)
(Patent Document 2) Korean Registered Patent No. 10-0898910 (Publication Date: May 21, 2009.)
(Patent Document 3) Korean Registered Patent No. 10-1810816 (Publication Date: Dec. 20, 2017.)

SUMMARY OF THE INVENTION

To solve the above-described conventional problems, the present invention relates to a fixing device for preventing a pipe from falling down, which can prevent the pipe from falling down when the pipe falls down as vibration occurs due to an earthquake etc., such that a clamp for fixing the pipe is removed from a structure.

To solve the above-described technical problem, a fixing device for preventing a pipe from falling down according to the present invention is a fixing device for preventing a pipe (10) installed on a structure from falling down, in which the fixing device includes: a top body (100) formed in a shape of a pipe having a hollow portion continuously formed from a top to a bottom of the top body (100), and fastened to a fixing anchor (20) fixedly installed on the structure; an elastic member (200) wrapped on an outer surface of the top body (100) in a ring shape by an elastic force, in which a part of a body of the elastic member (200) protrude toward an inside of the hollow portion in at least two spots; a bottom body (300) having an upper portion which is inserted through the hollow portion of the top body and is connected to the top body (100) while being fitted around an outer surface of the elastic member (200) protruding toward the inside of the hollow portion when the upper portion is inserted, and a lower portion which is fastened to a fixing ring (11) provided on the pipe (10); and a wire (400) having a predetermined length, and having an upper portion fastened to the top body (100) and a lower portion fastened to the bottom body (300) so as to prevent the pipe (10) from falling down when the bottom body (300) is separated from the top body (100) due to the falling down of the pipe (10), and wherein the elastic member (200) is formed in a shape of a coil spring and is installed on the top body (100) after being deformed into a ring shape such that both ends thereof are connected to each other.

In addition, the top body (100) may include: a plurality of fixing grooves (110) radially formed based on a center of a hollow portion having a predetermined diameter, and formed inside the top body (100); an insertion groove (120) into which the elastic member (200) is inserted so as to wrap a circumferential surface of the top body (100) in a ring shape; an opening portion (130) formed through an outer surface of the insertion groove (120) to communicate with an inside of the fixing groove (110) so that a part of the outer surface of the elastic member (200) disposed in the insertion groove (120) is drawn-in to protrude toward an inside of the fixing groove (110) so as to be detachably fastened to the bottom body (300); and a ring portion (140) extending upward from an upper surface of the top body (100) so as to be rotatably fastened to the fixing anchor (20), and the upper portion of the wire (400) may be rotatably fastened to the ring portion (140), and In addition, the top body (100) may further include a separation prevention cap (150) for preventing separation of the elastic member (200) inserted into the insertion groove (120), an inner surface of the separation prevention cap (150) is detachably screw-coupled to an outer surface of the lower portion of the top body (100), and an inclined taper (151), which makes contact with the outer surface of the elastic member (200), may be formed at an upper portion of the separation prevention cap (150) to press the elastic member (200) step by step.

In addition, the bottom body (300) may include: a columnar upper body (310) inserted through the hollow portion of the top body (100) so as to be detachable from the elastic member (200); and a columnar lower body (320) having an upper portion detachably coupled to a lower portion of the upper body (310) and a lower portion coupled to the fixing ring (11), and the lower portion of the wire (400) may be fastened to a through hole (327) formed in an outer surface of the lower body (320).

In addition, the upper body (310) may include: an insertion protrusion (311) formed in a conical shape with a pointed upper end and having an outer surface radially protruding to face the fixing groove (110) to make shape-match with the fixing groove (110); a coupling groove (313) formed in an outer surface of the insertion protrusion (311) to have a hemispherical shape, in which the elastic member (200) protruding toward the inside of the fixing groove (110)

is inserted into the coupling groove (313) through the opening portion (130); and a first screw groove (315) formed in a lower portion of the upper body (310) in a longitudinal direction, and detachably screw-coupled to the upper portion of the lower body (320), and between a pair of edge portions (E1 and E2) formed at upper and lower portions of the coupling groove (313), respectively, so as to be connected to the outer surface of the insertion protrusion (311), the edge portion (E1) formed at the upper portion may be configured to have a protrusion height lower than a protrusion height of the edge portion (E2) formed at the lower portion.

In addition, the lower body (320) further includes a connection bolt (321) which includes a washer (323) fastened to the fixing ring (11), and the connection bolt (321) may be detachably screw-coupled to a second screw groove (325) formed in a lower surface of the lower body (320) in a longitudinal direction. According to the present invention, compared to the related art, when the pipe falls down due to vibration such as an earthquake etc., the bottom body, which is installed in the fixing anchor and is inserted through the inside of the top body by the elastic member, is separated to maintain the connection state with the top body by the wire, so that the pipe coupled to the bottom body can be prevented from falling down by the wire.

BRIEF DESCRIPTION OF THE DRAWINGS

FIGS. 7(a)-7(c) are views illustrating a coupling relationship between an upper body and the elastic member according to FIG. 6.

DETAILED DESCRIPTION OF THE INVENTION

Figure 1:
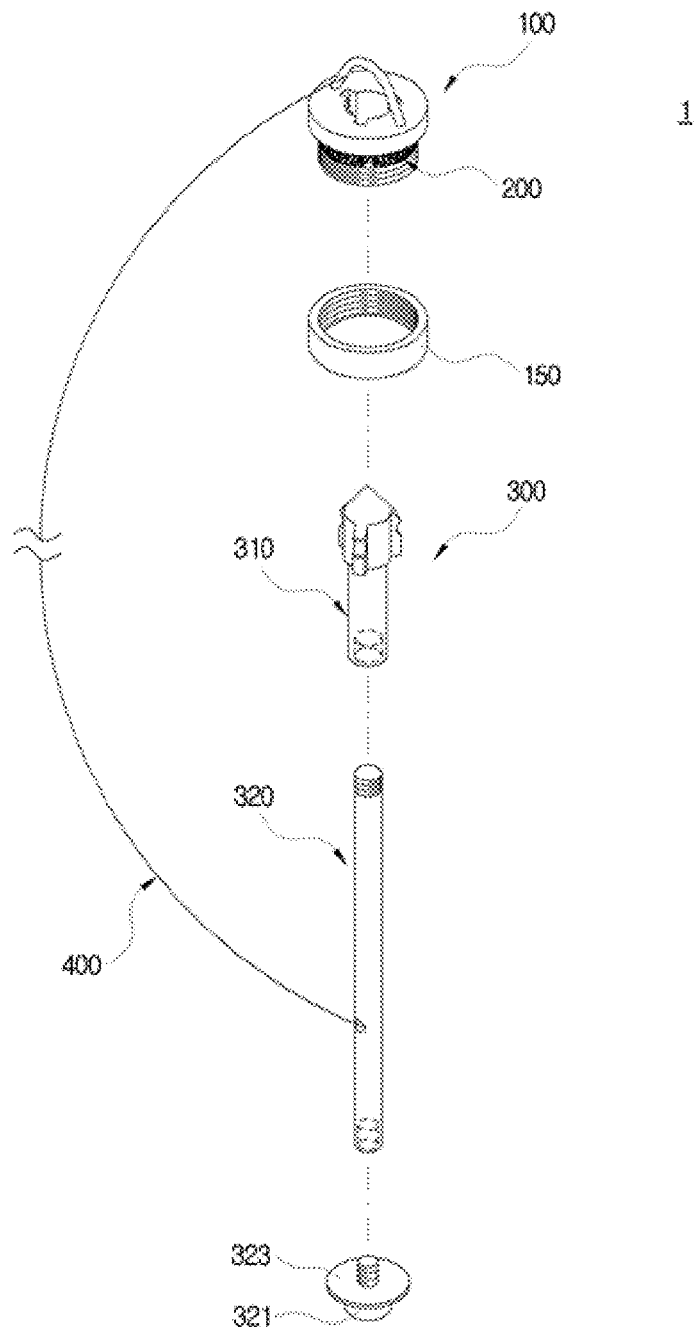
FIG. 1 is an exploded perspective view of a fixing device for preventing a pipe from falling down according to the present invention.

Hereinafter, various embodiments will be described in more detail with reference to the accompanying drawings. The embodiments described in the present specification may be variously modified. Particular embodiments are depicted in the drawings and may be described in detail in the detailed description. However, the specific embodiments shown in the accompanying drawings are only for easy understanding of various embodiments. Therefore, it should be understood that the technical idea is not limited by the specific embodiments shown in the accompanying drawings, but includes all equivalents or alternatives included in the spirit and technical scope of the invention.

Terms including an ordinal number such as "first" or "second" may be used for the names of various components, not limiting the components. The above-described terms are used to distinguish one component from another component.

In addition, the terms "comprise", "have" etc., herein are used to indicate that there are features, numbers, steps, elements, or combination thereof, and they should not exclude the possibilities of combination or addition of one or more features, numbers, operations, elements, or a combination thereof. It will be understood that when an element is referred to as being "connected" or "coupled" to another element, it may be directly connected or coupled to the other element or intervening elements may be present. In contrast, when an element is referred to as being "directly connected" or "directly coupled" to another element, it should be understood that intervening elements may be present.

In addition, in the following description of the present invention, a detailed description of known functions or configurations incorporated herein will be abbreviated or omitted when it is determined that the gist of the present invention may be unnecessarily unclear.

Hereinafter, a fixing device for preventing a pipe from falling down (hereinafter simply referred to as a 'fixing device') according to the present invention will be described in detail with reference to the accompanying drawings.

Prior to the description, a fixing anchor 20 to be described later is an anchor installed on a structure such as a ceiling inside a building and rotatably fastened to an upper portion of a fixing device 1 according to the present invention, and a fixing ring 11 is fastened to a pipe 10 and a lower portion of the fixing device 1, so that detailed descriptions thereof will be omitted so as to make the gist of the present invention unclear.

First, as illustrated in FIG. 1, the fixing device 1 according to the present invention includes a top body 100, an elastic member 200, a bottom body 300, and a wire 400.

In more detail, as illustrated in FIGS. 2 to 5, the top body 100 is detachably fastened to the bottom body 300 inserted through the elastic member 200, which will be described later.

For example, the top body 100 is formed in a shape of a pipe having a hollow portion continuously formed from a top surface to a bottom surface of the top body 100, in which an upper portion of the top body 100 is rotatably fastened to the fixing anchor 20, and a lower portion of the top body 100 is detachably fastened to the bottom body 300, and an outer surface thereof has the elastic member 200 inserted in a ring shape.

To satisfy such structural characteristics, the top body 100 according to the present invention includes a fixing groove 110, an insertion groove 120, an opening portion 130, a ring portion 140, and a separation prevention cap 150.

As illustrated, a plurality of fixing grooves 110 are formed through the top body 100 in a longitudinal direction, and radially extend in a shape of a groove based on an arbitrary center point of the hollow portion having a predetermined diameter so as to be connected to an end portion of the hollow portion.

An insertion protrusion 311, which will be described later, is inserted into the fixing groove 110 to make shape-match with the fixing groove 110, thereby satisfying a structure in which the top body 100 and the bottom body 300 are coupled to each other by the elastic member 200.

In addition, as illustrated, the insertion groove 120 is formed on a circumferential surface of the top body 100 in a band shape, so that after the elastic member 200 having a ring shape is inserted, the insertion groove 120 may be formed in the outer surface of the top body 100 by the elastic force of the elastic member 200.

In this case, the top body 100 preferably has a structure in which an opening portion 130 is formed continuously from the outer surface of the insertion groove 120 to an inner surface of the fixing groove 110, so that a part of the outer surface of the elastic member 200 inserted into the insertion groove 120 has a hemispherical shape protruding toward the inside of the fixing groove 110, and thus, the elastic member 200 is detachably coupled to a coupling groove 313, which is formed in the insertion protrusion 311, while making shape-match with the coupling groove 313.

As illustrated, the ring portion 140 is formed on the top body 100 to have a semi-circular ring shape so as to be rotatably coupled to the fixing anchor 20, and simultaneously fastened to an upper portion of the wire 400.

In addition, the separation prevention cap 150 is screw-coupled to an outer surface of the lower portion of the top body 100 to prevent the elastic member 200, which is inserted into the insertion groove 120, from being separated from the outside, and adjusts an external force of the elastic member 200 inserted into the coupling groove 313 formed in the outer surface of an upper body 310, which will be described later.

To this end, an inner surface of the separation prevention cap 150 is detachably screw-coupled to a screw thread formed on the outer surface of the lower portion of the top body, and an inclined taper 151, which becomes narrow upward, is formed at an upper portion of the separation prevention cap 150.

That is, the separation prevention cap 150, which is screw-coupled to the outer surface of the top body 100, moves upward according to the degree of tightening by the user so that an outer surface of the inclined taper 151 may press the outer surface of the elastic member 200 provided in the insertion groove 120 step by step to adjust a pressing force of the upper body 310 inserted into the top body 100 through the opening portion 130, and thus the separation prevention cap 150 may support pipes 10 having different weights by changing the degree of pressurization of the upper body 310 by the elastic member 200 step by step.

Figure 2:
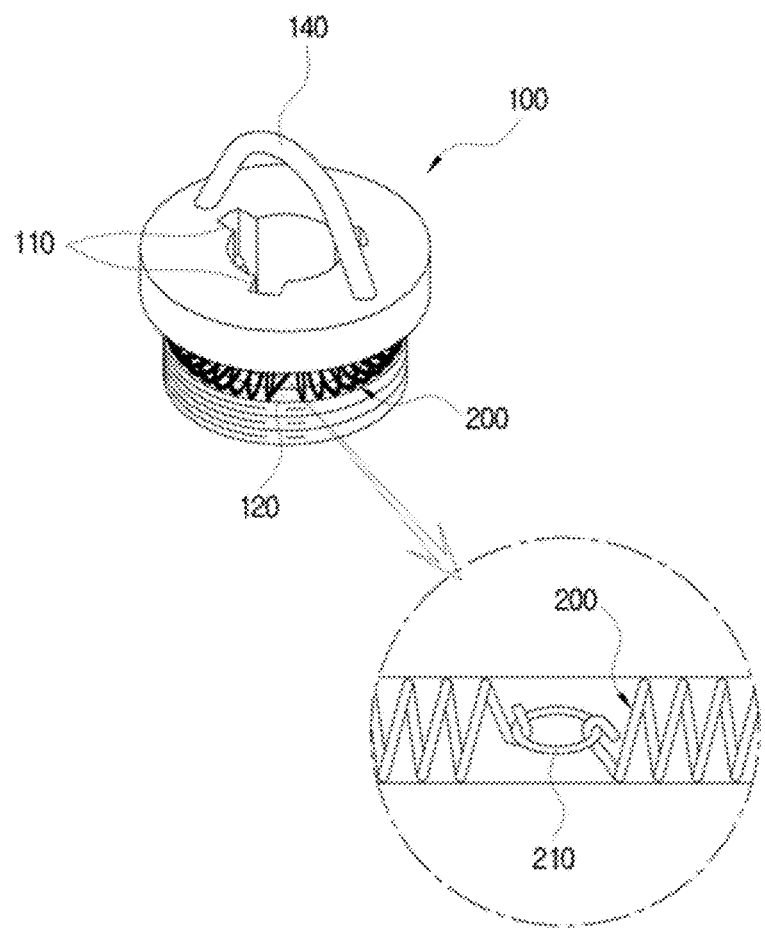
FIG. 2 is a view illustrating a top body and an elastic member of the fixing device for preventing a pipe from falling down according to the present invention.
Figure 3:
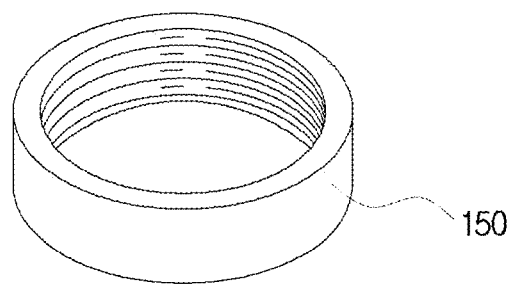
FIG. 3 is a view illustrating a separation prevention cap constituting the top body according to FIG. 2.
Figure 4:
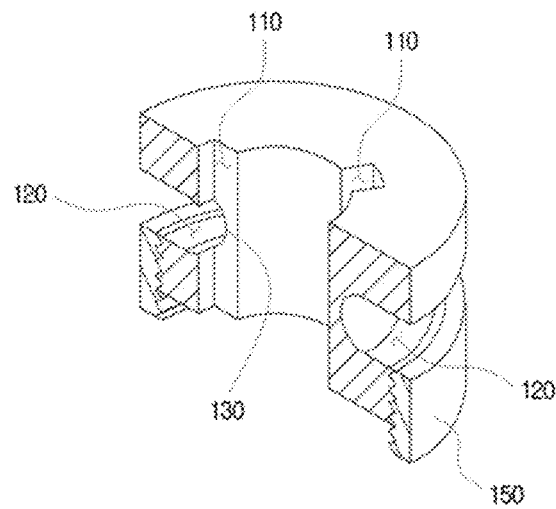
FIG. 4 is a sectional view of the top body according to FIG. 2.
Figure 5:
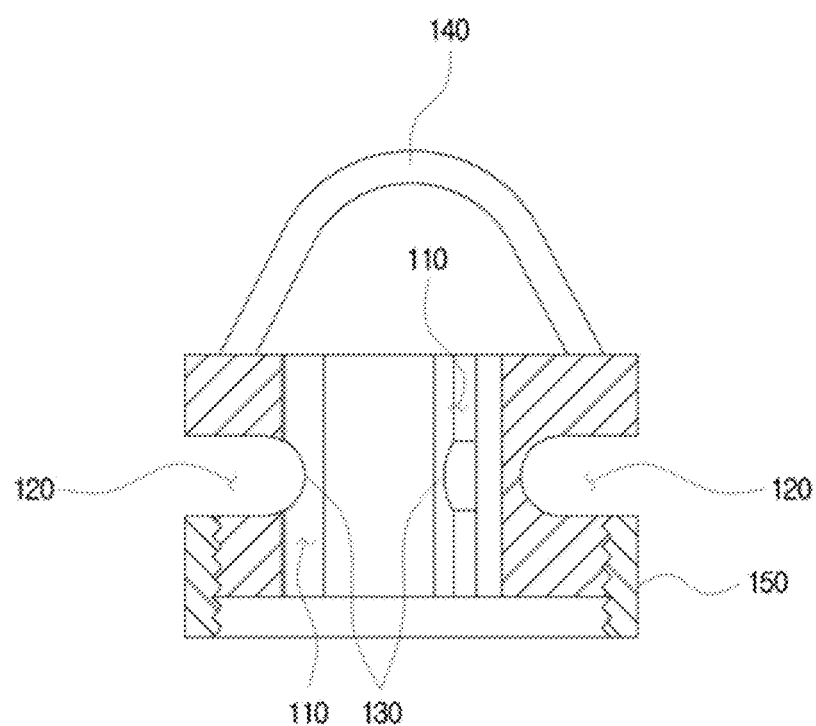
FIG. 5 is a front sectional view of the top body according to FIG. 4.

In addition, as illustrated in FIGS. 1 and 2, the elastic member 200 is configured such that the bottom body 300 inserted through the hollow portion may be detachably coupled to the top body 100.

For example, as illustrated, the elastic member 200 may be formed by bending a coil spring having a length in a vertical direction such that the coil spring may satisfy a ring shape, and after the coil spring is bent, a pair of end portions facing each other may be connected to each other by a separate fastening ring 210 to maintain the ring shape.

The elastic member 200 having a ring shape may be installed on the outer surface of the top body 100 such that a part of the outer surface of the elastic member 200 protrudes toward the inside of the fixing groove 110 through the opening portion 130 formed in the insertion groove 120, thereby fastening the bottom body 300 inserted through the hollow portion to the top body 100.

Meanwhile, although not illustrated, the fastening ring 210 according to the present invention may be fastened to both ends of the elastic member 200 to have a structure that may be replaced if necessary, and accordingly, the fixing ring 210 may adjust the elastic force of the elastic member 200 inserted into the insertion groove 120 in a ring shape, may prevent the elastic member 200 from being rotated in the insertion groove 120 along a moving direction of the insertion protrusion 311 while the elastic member 200 is inserted into the coupling groove 313, and simultaneously, may facilitate the maintenance of the elastic member 200.

In addition, the elastic member 200, which couples the top body 100 to the bottom body 300 according to the present invention may be provided in the top body 100 to push a ball (not illustrated) in one direction in the same manner as an elastic member 200 according to another embodiment if necessary, and the bottom body 300 entering the inside of the top body 100 may be fixedly coupled to the ball, and a plurality of balls may also be installed to protrude toward the inside of the fixing groove 110 through a plurality of opening portions 130 that are radially formed.

However, when a replacement of a spring for pushing any one or more balls among the plurality of balls is required due to a decrease in elastic force of the spring, it is impossible for an operator to check whether the elastic force of the spring corresponding to which ball decreases due to a slight difference, so that all of the plurality of balls have to be replaced together with the spring or the entire top body 100.

Therefore, to solve the above-described problems, the present invention realizes an advantage in which a fastening force between the top body 100 and the bottom body 300 may be maintained at all times through a simple operation of replacing only the elastic member 200 itself in a one-to-one manner.

Furthermore, it has been described that the elastic member 200 is mounted such that both ends thereof are fastened to each other by the fastening ring 210 to have a ring shape, but this is merely one embodiment, and if necessary, the elastic member 200 may be used to have a ring shape by fastening both ends of the elastic member 200.

Figure 6:
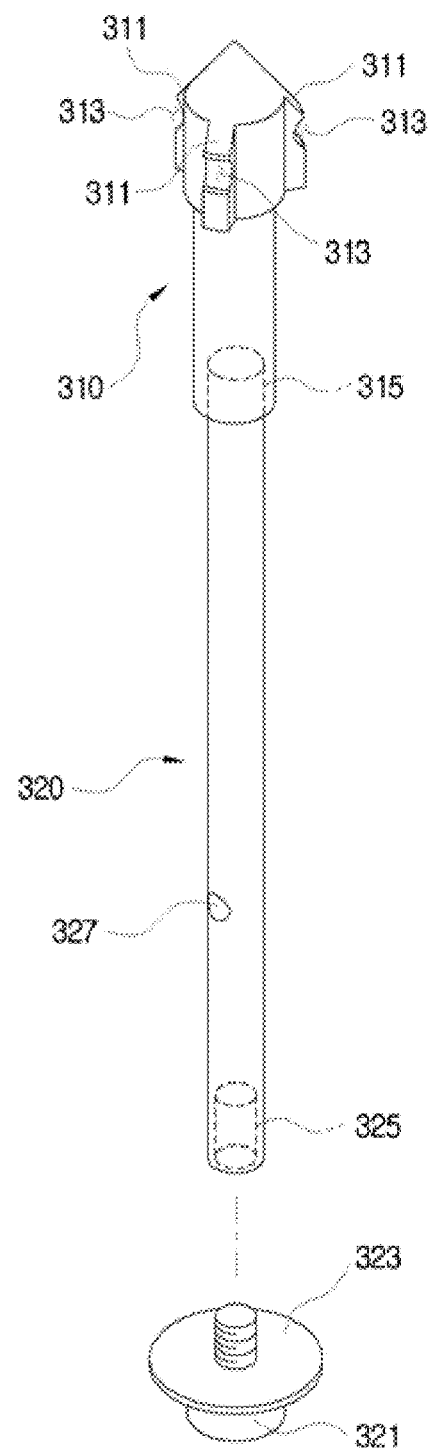
FIG. 6 is an exploded perspective view of a bottom body for the fixing device for preventing a pipe from falling down according to the present invention.
Figure 7C:
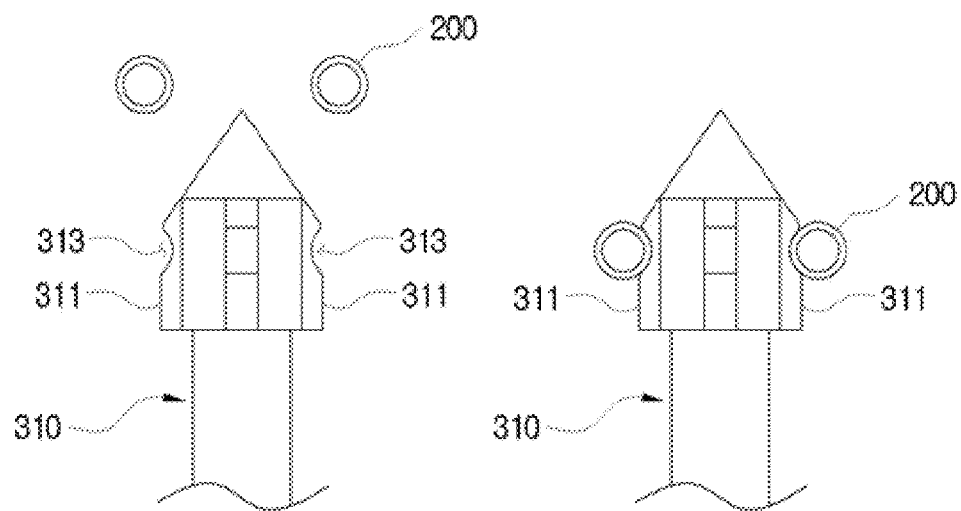
Figure 7C:
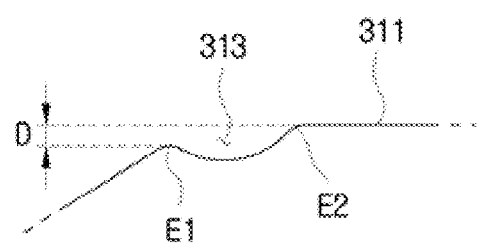

In addition, as illustrated in FIGS. 6 and 7(*a*)-7(*c*), the bottom body 300 is configured such that the lower portion thereof is connected to the pipe 10 and the wire 400 and the upper portion thereof is coupled to the top body 100 through the elastic member 200, so that the pipe 10 is separated from the top body 100 by vibration such as an earthquake etc., and simultaneously, the wire 400 connected to the top body 100 prevents the pipe 10 from falling down.

For example, the bottom body 300 is formed in a cylindrical shape as a whole and includes an upper body 310 coupled to the top body 100 and a lower body 320 fastened to the upper body 310 such that the upper body 310 may be connected to the pipe 10.

In this case, as illustrated, the upper body 310 includes the insertion protrusion 311, the coupling groove 313, and a first screw groove 315, in which an upper portion of the upper body 310 is formed in a conical shape with a pointed upper end to facilitate entry into the hollow portion.

A plurality of insertion protrusions 311 radially protrude from the outer surface based on an arbitrary center point of the upper body 310 formed in a cylindrical shape, and protrude in a shape in which the insertion protrusion 311 is inserted into the fixing groove 110 to make shape-match with the fixing groove 110.

The coupling groove 313 is formed in a hemispherical shape having a groove formed in the outer surface of each insertion protrusion 311, so that when the insertion protrusion 311 is inserted into the fixing groove 110, the outer surface of the elastic member 200, which protrudes toward the inside of the fixing groove 110 through the opening 130, is inserted into the coupling groove 313, thereby satisfying a structure in which the top body 100 is detachably coupled to the bottom body 300.

Meanwhile, as illustrated in FIG. 7(*c*), between a pair of edge portions E1 and E2 connected to each other between end portions of the insertion protrusion 311 and the coupling groove 313, the upper edge portion E1 directed toward the top body 100 protrudes such that a maximum protrusion height thereof is lower than a maximum protrusion height of the lower edge portion E2 directed toward the lower body 320 so as to form a distance D therebetween, and thus the elastic member 200, which protrudes toward the inside of the fixing groove 110, may be more easily inserted into the coupling groove 313.

The first screw groove 315 extends upward from the lower portion of the upper body 310 to have a shape of a groove inside the upper body 310, and is screw-coupled to the upper portion of the lower body 320 through a screw thread formed on an inner circumferential surface thereof.

In this case, although not illustrated, it is preferable that the lower body 320 coupled to the first screw groove 315 is used by adjusting the entire vertical length of the bottom body 300 according to a coupling depth and selectively applying the vertical length of the bottom body 300 according to a distance between the fixing anchor 20 and the fixing ring 11.

In addition, as illustrated, the lower body 320 includes a connection bolt 321 and a second screw groove 325.

The connection bolt 321 passes through the fixing ring 11 formed on an outer surface of the pipe 10 and is detachably screw-coupled to the second screw groove 325 formed under the lower body 320.

In this case, it is preferable that a washer 323 may be further provided between the connection bolt 321 and the lower surface of the fixing ring 11 to prevent the connection bolt 321 from being separated from the fixing ring 11.

Figure 8:
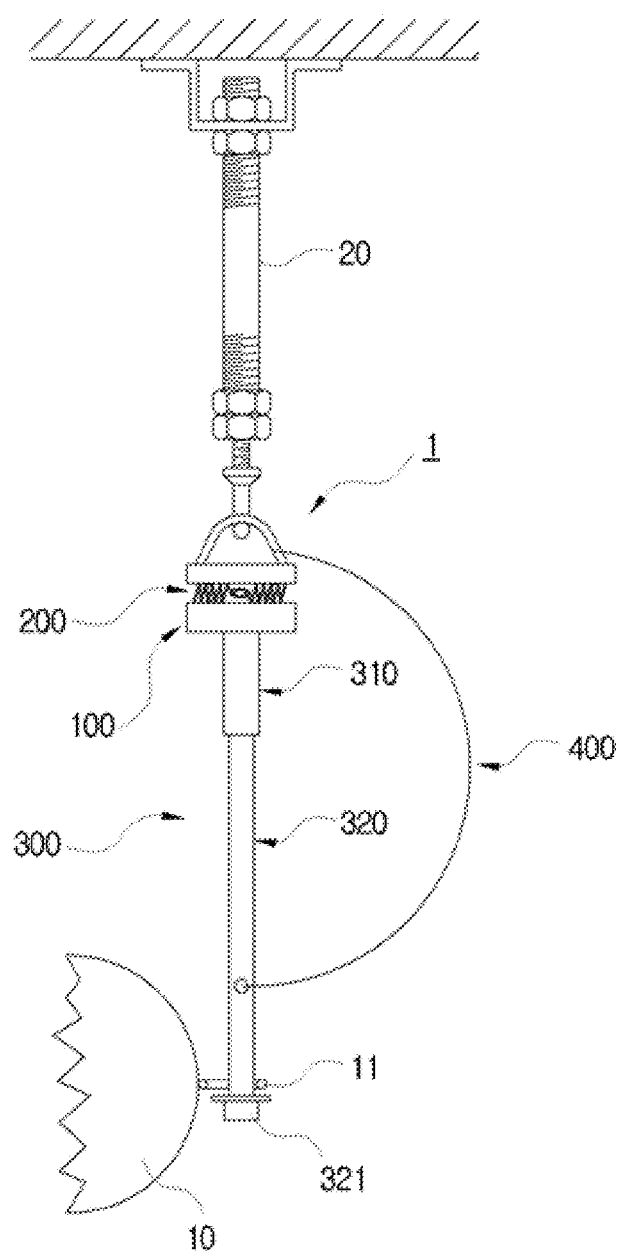
FIGS. 8 and 9 are operational relationship views of the fixing device for preventing a pipe from falling down according to the present invention.
Figure 9:
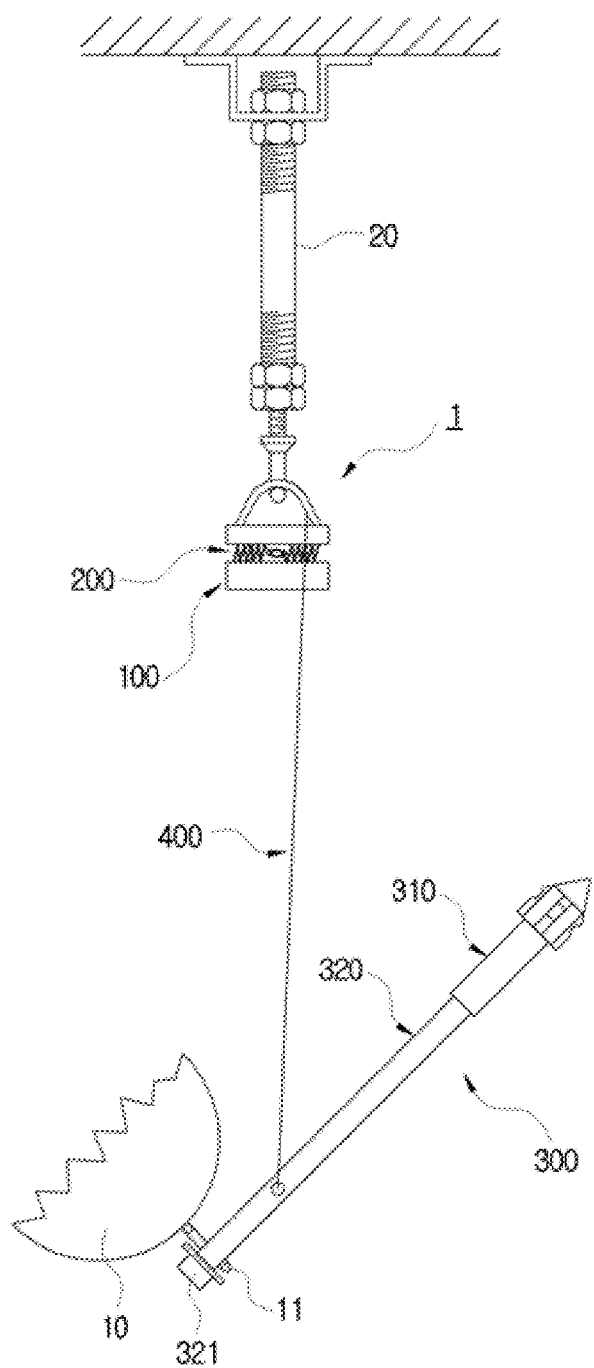

In addition, as illustrated in FIGS. 8 and 9, the wire 400 is configured to maintain the connection between the top body 100 and the bottom body 300 to prevent the pipe 10 from falling down when the top body 100 and the bottom body 300 are separated from each other when the pipe 10 falls down due to vibration etc.

To this end, the wire 400 with a predetermined length has a structure in which an upper portion thereof is fastened to the ring portion 140 and a lower portion thereof is fastened to a through hole 327 formed through the lower body 320, so that the top body 100 and the bottom body 300 are connected to each other by the wire 400 while being separated from each other.

Therefore, unless the fixing ring 11 and the lower body 320 provided in the pipe 10 are separated from each other, the top body 100 coupled to the fixing anchor 20 by the wire 400 may support the pipe 10 so as to prevent the pipe 10 from falling down.

As described above, compared to the related art, when the pipe 10 falls down through vibration such as an earthquake etc., the bottom body 300, which is installed on the fixing anchor 20 and is inserted through the inside of the top body 100 by the elastic member 200, maintains the connection state with the top body 100 by the wire 400 while being separated from the top body 100, and accordingly, the fixing device 1 according to the present invention can prevent the pipe 10 coupled to the bottom body 300 from falling down by the wire 400.

Although the present invention has been made with reference to illustrative embodiments and drawings as well as certain matters such as specific elements, the embodiments are provided for overall understanding of the present invention, and the present invention is not limited to the embodiments. It is understood by those skilled in the art that various changes and modifications can be made in these embodiments.

Accordingly, the spirit of the present invention will not be limited to the embodiments described above, and the claims described below and all ranges equivalent to or modified from the claims will fall within the scope of the spirit of the present invention.

What is claimed is:

1. A fixing device for preventing a pipe installed on a structure from falling down, the fixing device comprising:
   a top body formed in a shape of a pipe having a hollow portion continuously formed from a top to a bottom of the top body, and fastened to a fixing anchor fixedly installed on the structure;
   an elastic member wrapped on an outer surface of the top body in a ring shape by an elastic force, in which a part of a body of the elastic member protrudes toward an inside of the hollow portion in at least two spots;
   a bottom body having an upper portion which is inserted through the hollow portion of the top body and is connected to the top body while being fitted around an outer surface of the elastic member protruding toward the inside of the hollow portion when the upper portion is inserted, and a lower portion which is fastened to a fixing ring configured to be fastened to the pipe; and
   a wire having a length, and having an upper portion fastened to the top body and a lower portion fastened to the bottom body so as to prevent the pipe from falling down when the bottom body is separated from the top body due to the falling down of the pipe,
   wherein the elastic member is formed in a shape of a coil spring and is installed on the top body after being deformed into the ring shape such that both ends thereof are connected to each other,
   wherein the top body includes: a plurality of fixing grooves radially formed based on a center of a hollow portion having a diameter, and formed inside the top body; an insertion groove into which the elastic member is inserted so as to wrap a circumferential surface of the top body in the ring shape; an opening portion formed through an outer surface of the insertion groove to communicate with an inside of the fixing groove so that a part of the outer surface of the elastic member disposed in the insertion groove is drawn-in to protrude toward the inside of the fixing groove so as to be detachably fastened to the bottom body; and a ring portion extending upward from an upper surface of the top body so as to be rotatably fastened to the fixing anchor, in which the upper portion of the wire is rotatably fastened to the ring portion, and
   wherein the top body further includes a separation prevention cap for preventing separation of the elastic member inserted into the insertion groove, an inner surface of the separation prevention cap is detachably screw-coupled to an outer surface of the lower portion of the top body, and an inclined taper, which makes contact with the outer surface of the elastic member, is formed at an upper portion of the separation prevention cap (150) to press the elastic member step by step.

2. The fixing device of claim 1, wherein the bottom body includes:
   a columnar upper body inserted through the hollow portion of the top body so as to be detachable from the elastic member; and
   a columnar lower body having an upper portion detachably coupled to a lower portion of the upper body and a lower portion coupled to the fixing ring, and
   wherein the lower portion of the wire is fastened to a through hole formed in an outer surface of the lower body.

3. The fixing device of claim 2, wherein the upper body includes:
- an insertion protrusion formed in a conical shape with a pointed upper end and having an outer surface radially protruding to face the fixing groove to make a shape-match with the fixing groove;
- a coupling groove formed in the outer surface of the insertion protrusion to have a hemispherical shape, in which the elastic member protruding toward the inside of the fixing groove is inserted into the coupling groove through the opening portion; and
- a first screw groove formed in the lower portion of the upper body in a longitudinal direction, and detachably screw-coupled to the upper portion of the lower body, and
- wherein between a pair of first and second edge portions formed at upper and lower portions of the coupling groove, respectively, so as to be connected to the outer surface of the insertion protrusion, the first edge portion formed at the upper portion is configured to have a protrusion height lower than a protrusion height of the second edge portion formed at the lower portion.

4. The fixing device of claim 2, wherein the lower body further includes a connection bolt which includes a washer fastened to the fixing ring, and
- wherein the connection bolt is detachably screw-coupled to a second screw groove formed in a lower surface of the lower body in a longitudinal direction.

\* \* \* \* \*